United States Patent [19]

Morris

[11] 4,425,095

[45] Jan. 10, 1984

[54] TACTILE WRITING AID

[76] Inventor: Henry Morris, P.O. Box 9533, Newcastle, 2940, Natal, South Africa

[21] Appl. No.: 328,487

[22] Filed: Dec. 7, 1981

[51] Int. Cl.³ .............................................. G09B 21/00
[52] U.S. Cl. .................................................... 434/117
[58] Field of Search ................ 434/117, 164, 112, 113

[56] References Cited

U.S. PATENT DOCUMENTS

| | | | |
|---|---|---|---|
| 1,371,430 | 3/1921 | Nickerson | 434/117 |
| 2,616,198 | 11/1952 | Sewell | 434/112 X |
| 3,667,139 | 6/1972 | Barr | 434/113 |
| 3,872,611 | 3/1975 | Kuhn | 434/117 |

FOREIGN PATENT DOCUMENTS 117420  7/1918  United Kingdom ................ 434/117

*Primary Examiner*—William H. Grieb
*Attorney, Agent, or Firm*—Charles E. Brown

[57] ABSTRACT

The invention provides a writing aid comprising a contoured surface having a plurality of relatively depressed surface portions and raised ridges or surface regions at least partially surrounding each depressed surface portion at a level differing therefrom by an amount rendering transition between a ridge or region and a depressed portion tangible to a person through a hand-held writing implement traversing the surface. The contoured surface may be provided by embossing writing paper or embedding threads therein, or may be provided on a substrate or backing sheet for a piece of plain paper.

4 Claims, 10 Drawing Figures

TACTILE WRITING AID

BACKGROUND OF THE INVENTION

The invention relates to writing aids for use in assisting the clear and accurate formation of written symbols and letters. It is particularly useful where written symbols or letters are not visible to the writer either because of conditions of darkness or because the writer is blind or partially sighted.

The invention may equally be applicable in teaching the blind or partially-sighted to detect and/or to reproduce the correct formation of symbols or letters and in ensuring that the letters of a fluent writer are neat and legible. Moreover the invention may be adapted for use with shorthand or speed-writing, or with other than Roman alphabets and also for work involving graph paper.

BRIEF DESCRIPTION OF THE INVENTION

The invention provides a writing aid comprising a contoured surface having a plurality of relatively depressed surface portions and raised ridges or surface regions at least partially surrounding each depressed surface portion at a level differing therefrom by an amount rendering transition between a ridge or region and a depressed portion tangible to a person through a hand-held writing implement traversing the surface.

Conveniently the person may write directly upon the contoured surface, the surface being formed on a sheet of writing material, or alternatively, the surface may be formed on a substrate upon which a sheet of suitable weight writing material may be placed, the layout of the raised ridges or regions being capable of detection by the person's sense of touch, through the writing material.

Advantageously, the depressed surface portions are arranged in rows, corresponding to the lines of writing to be formed, one such surface portion corresponding to one letter of a desired word or a space between two neighbouring words. Where the words are to be written in cursive script, further surface portions may be provided lying a level generally between that of the depressed area and, say the surrounding ridge, two of said further, intermediate surface portions being positioned one above and one below the depressed portion and corresponding to the formation of the looped portions of such letters as "j", "f", "l" or "y" or the heightwise strokes of such letters as "p", "q" or "d". It will be understood that the transition to or from an intermediate surface portion will be detectable as exhibiting a low level of change detectable in the movement of the writing implement, whereas the transition between ridges or raised surface areas and depressed areas is much more noticeable to the writer.

In examples of writing aids according to the invention, the contoured surface may be formed by an embossing technique on paper, or the insertion during manufacture of paper of threads or tapes of selected thicknesses or widths, arranged in a grid pattern and, if convenient, embedded between two layers of thin paper. In other examples of the invention a contoured backing sheet is laid beneath a sheet of thin paper.

While it is evident that writing aids according to this invention are of considerable assistance to the blind or partially-sighted in writing messages or instructions in a clear and legible manner, it is also useful for use in military or police operations where it is necessary for clear notes to be made during concealed surveillance of a target or suspect under conditions of darkness.

BRIEF DESCRIPTION OF DRAWINGS

There will now be described several examples of writing aids according to the invention. It will be understood that the description, which is to be read with reference to the drawings, is given by way of example only and not by way of limitation.

In the drawings.

DETAILED DESCRIPTION OF THE DRAWINGS

Figure 1:
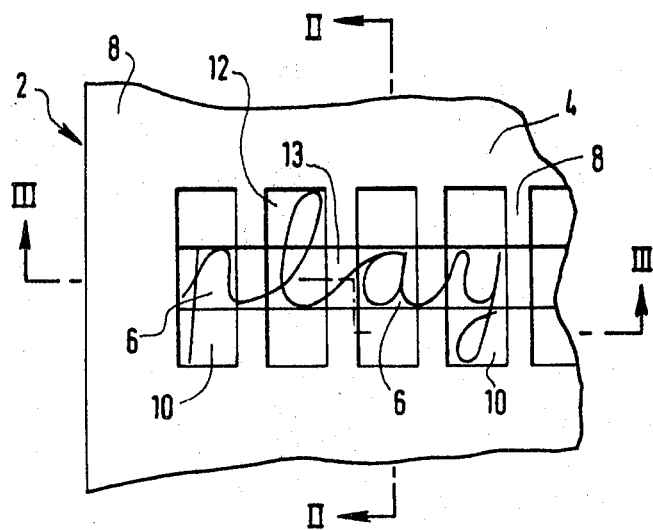
FIG. 1 shows a fragmentary portion of paper embossed to provide a contoured surface area.

FIG. 1 shows a portion of paper 2 having been pressed between die-plates in an embossing operation to provide a contoured surface 4. The surface 4 comprises a row of surface portions 6 depressed relatively to a raised surface region 8 partially surrounding each portion 6.

As may be seen from the Figure, when the word "play" is written upon the paper, the letter "a" is wholly received within the appropriate portion 6 and has been formed with a writing implement with which the writer detected the boundaries of the portion 6 so as to guide the formation of the letter. However, the first letter of the word is "p", the main body of which is formed within the appropriate portion 6 but which also has a downwardly extending stroke. Thus the writer, when attempting to form the letter "p", will detect the lower boundary of the portion 6 and the writing implement will cross the transition between the portion 6 and a surface portion 10 which is at a level intermediate of the levels of portion 6 and the raised surface region 8. The lower stroke of the letter "p" will thus be terminated at the lower boundary of the portion 10. Letters "l" and "y" each have heightwise looped strokes which are formed on portions 12 and 10 respectively. A further intervening portion 13 is provided between the portion 6 of adjacent letters, which portion 13 is arranged at the same level as portion 10. Detection by touch (feel) of the boundaries of this portion 13 guides the formation of the linking stroke between letters. It will be understood that the word "play" has been written in an upright orientation, but if it is desired to form a more italicised script, the areas 6, 10 and 12 may be embossed to provide an inclined lay-out, in which the heightwise ridges are oblique.

It will be found convenient if a plurality of sheets of paper embossed as described above are formed in to writing pads for ease of use. A firm, contoured backing sheet may be included to assist in preserving the embossed contours of the paper. Suitably embossed address panels may also be incorporated in envelopes for use by the blind.

Figure 2:
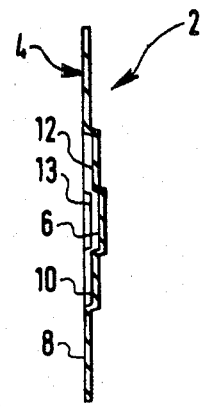
FIGS. 2 and 3 are sectional views on lines II—II and III—III respectively of FIG. 1.
Figure 3:
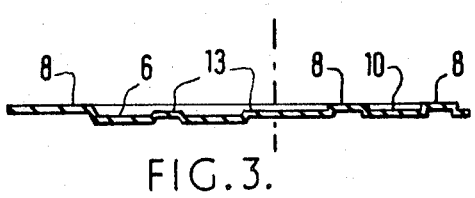
Figure 4:
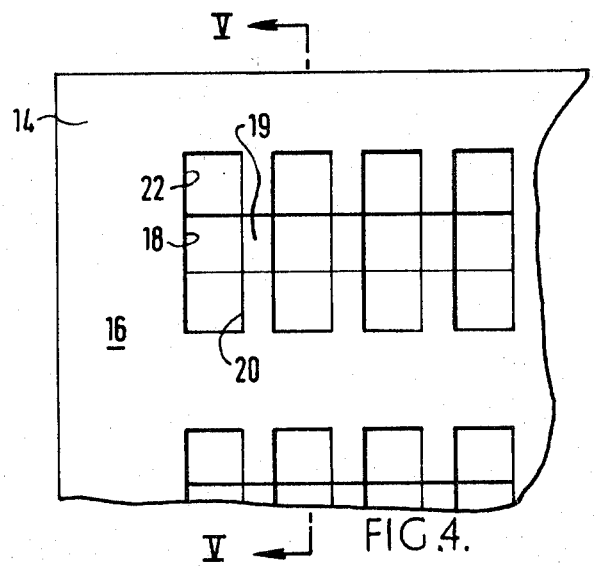
FIG. 4 is a fragmentary view of a contoured substrate or backing sheet according to the invention.
Figure 5:
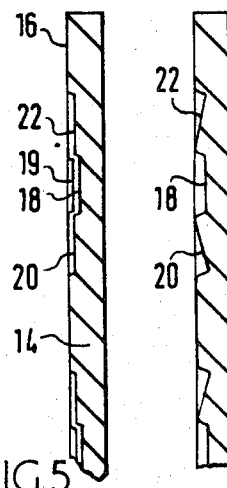
FIG. 5 is a sectional view on line V—V of FIG. 4.
Figure 6:
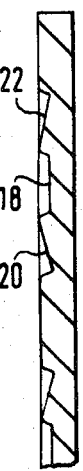
FIG. 6 is a sectional view of a substrate or backing sheet having an alternative configuration to that of the sheet of FIG. 4.

FIG. 4 shows a fragmentary view of a backing sheet 14 upon which a piece of plain paper may be laid. The surface 16 of the backing sheet 14 is contoured to provide depressed surface portions 18 and intermediate level surface portions 20, 22 corresponding to the portions 6 and 10, 12, respectively of FIG. 1. The two portions 18 and 20 are in parallel planes as shown in FIG. 5, but alternatively the portion 20, 22 may be arranged at an angle to the surface 16 as shown in FIG. 6, thereby reducing the overall depth necessary for the portion 18. Portion 19 corresponds in function to the surface 13 of FIGS. 1–3. When in use, a writing implement such as ball-point pen is applied to the plain paper (not shown) and the individual letters formed with detection of the contours in the backing sheet surface 16 through the paper.

Figure 7:
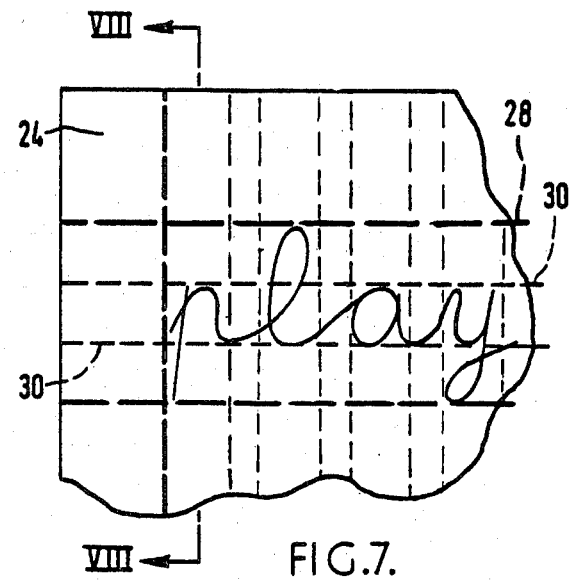
FIG. 7 is a fragmentary view of a piece of paper having guide threads therein.
Figure 8:
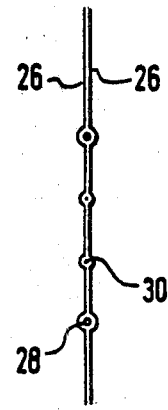
FIG. 8 is a sectional view taken on the line VIII—VIII of FIG. 7.

FIG. 7 shows a piece of writing material 24 comprising two superimposed sheets of thin paper 26, between which is arranged a regular network of threads 28, 30. The threads 28 which define the farthest extent of the letters are thicker than the threads 30 which provide a guide for the height of the body of each letter which are crossed more easily than the thread 28 by the writing implement when loops or strokes are required.

Figure 9:
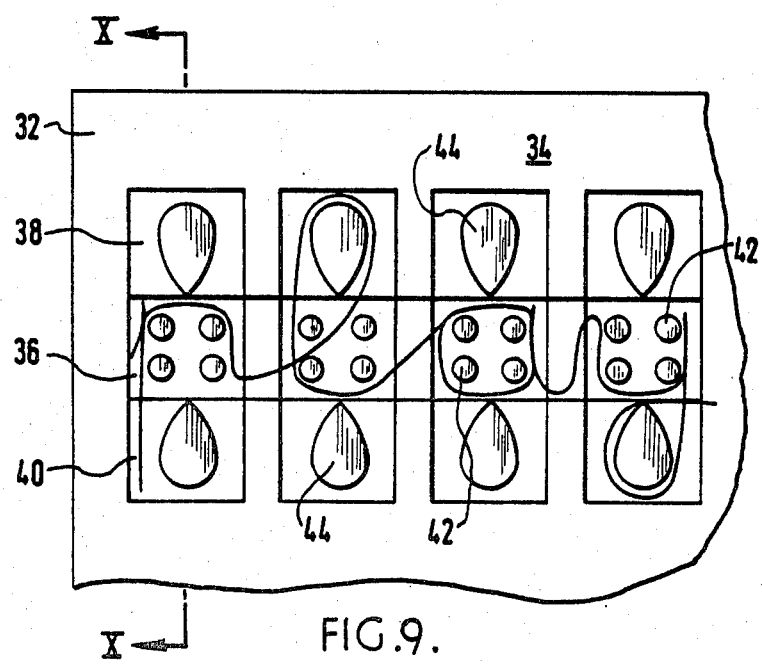
FIG. 9 is a fragmentary view of a further example of a substrate or backing sheet according to the invention.
Figure 10:
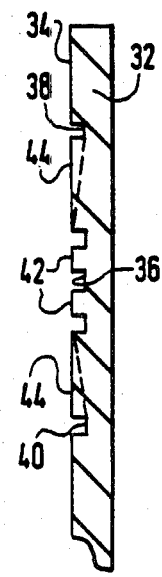
FIG. 10 is a sectional view on line X—X of FIG. 9.

FIG. 9 shows a backing sheet 32 having additional guide features compared with the backing sheet 14 of FIG. 4. The surface 34 of the backing sheet has portions 36, 38, 40 corresponding with portions 18, 20, 22 of FIG. 4.

In order to assist with the formation of the actual letters, in contrast to guiding only their spacing and arrangement in a straight line, four projections 42 are provided on the portions 36, around which the body portions of the letters are formed. To assist in the formation of heightwise strokes and loops, further projections 44 are provided on the angled surface portions 38 and 40, which projections are, in the present example, generally tear-shaped.

The substrates or backing sheets 14 and 32 may normally be made of a hard plastics material, but as the writing aid according to this invention may also be used as a teaching aid it may be found convenient if the plastics material used is one which is capable of deformation by contact with a pointed implement, for example a stylus, which forms a groove in the substrate surface as the letters are formed. Alternatively, the grooves may be formed in a substrate at the same time as the contoured surface. A blind person can, in either case, learn the shape of the letters by tracing their configuration using a stylus to follow the grooves. In doing so, the blind person will also detect the layout of the contoured portions and will then be able to use these as explained above as a guide to form their own words in a neat and legible manner.

A contoured surface formed from deformable material as described above may also be used by a person who wishes to correspond with a blind person, by imprinting upon the depressed surface portions of the substrate by means, for example, of a stylus a plurality of grooves corresponding in lay-out to the written word. Thus the blind person, familiar with the layout of the surface portions may detect by touch the grooves formed upon them and so decipher the words and their meaning.

I claim:

1. A writing aid comprising a contoured surface having a plurality of relatively depressed surface portions and raised ridges or surface regions at least partially surrounding each depressed surface portion at a level differing therefrom by an amount rendering transition between a ridge or region and a depressed portion tangible to a person through a hand-held writing implement traversing the surface, the contoured surface including at least one row of said depressed surface portions corresponding to the body portions of letters to be formed, each depressed surface portion being provided with two intermediate surface portions adjacent thereto and formed at a level between that of the depressed surface portion and that of said raised ridges or region to correspond to the position of heightwise strokes or looped portions of said letters.

2. A writing aid comprising a contoured surface having a plurality of relatively depressed surface portions and raised ridges or surface regions at least partially surrounding each depressed surface portion at a level differing therefrom by an amount rendering transition between a ridge or region and a depressed portion tangible to a person through a hand-held writing implement traversing the surface, said depressed surface portions being provided with projections around which the letter may be formed.

3. A writing aid comprising a contoured surface having a plurality of relatively depressed surface portions and raised ridges or surface regions at least partially surrounding each depressed surface portion at a level differing therefrom by an amount rendering transition between a ridge or region and a depressed portion tangible to a person through a hand-held writing implement traversing the surface, the contoured surface being formed by threads or tapes embedded in writing paper.

4. An aid as claimed in claim 3, wherein the threads are of at least two tangibly different thicknesses.

* * * * *